United States Patent [19]

Kordon

[11] 4,233,915
[45] Nov. 18, 1980

[54] APPARATUS FOR CULTIVATING SOIL

[76] Inventor: Moonish J. Kordon, 4300 Atlantic Ave., Brooklyn, N.Y. 11224

[21] Appl. No.: 34,572

[22] Filed: Apr. 30, 1979

[51] Int. Cl.$^3$ ............................................. A01C 23/02
[52] U.S. Cl. ............................................. 111/6; 111/91
[58] Field of Search ............... 111/6, 7, 7.1, 7.2, 111/7.3, 89, 91, 35, 51, 1

[56] References Cited

U.S. PATENT DOCUMENTS

| | | | |
|---|---|---|---|
| 1,171,277 | 2/1916 | Thayer | 111/6 |
| 1,424,728 | 8/1922 | Knight | 111/6 |
| 1,954,698 | 4/1934 | Giddings | 111/7.2 |
| 2,525,435 | 10/1950 | White | 111/39 |
| 2,649,061 | 8/1953 | Hawkins et al. | 111/6 |
| 2,876,718 | 3/1959 | Vaughan | 111/7 |
| 3,185,118 | 5/1965 | Greene | 111/51 |
| 3,331,340 | 7/1967 | Tschlidy | 111/91 |
| 3,492,954 | 2/1970 | Rothfelder | 111/51 |
| 3,602,166 | 8/1971 | Peterson | 111/6 |
| 3,648,631 | 3/1972 | Fiedler et al. | 111/6 |
| 3,967,564 | 7/1976 | Emling | 111/7 |

FOREIGN PATENT DOCUMENTS 732750 6/1955 United Kingdom ............... 111/7
493202 11/1975 U.S.S.R. ............................ 111/6

OTHER PUBLICATIONS

Anon. *Directory of Products/EBG'79*, pp. 507, 518, 528, 494, 521 and 524, (Publisher unknown).

Primary Examiner—Edgar S. Burr
Assistant Examiner—James R. Feyrer
Attorney, Agent, or Firm—Anthony J. Casella; Michael A. Stallman

[57] ABSTRACT

An apparatus and method for cultivating soil by forcing a burst of pressurized fluid into the soil. The apparatus is provided with a horizontal hollow shaft, rotatably mounted on a frame member, and having a plurality of hollow rods extending radially therefrom, and arranged in longitudinal rows. Each rod is tipped with a conically shaped soil piercing nozzle, and a burst of pressurized fluid is provided to the nozzles via a tank and valve arrangement. When the apparatus is pulled by a tractor, the longitudinal rows of rods are sequentially embedded in the soil under the force of the weight of the apparatus and a burst of pressurized fluid is vented through the embedded nozzles to break up the soil into small pieces. The fluid can be either air, water, or liquid fertilizer.

5 Claims, 3 Drawing Figures

APPARATUS FOR CULTIVATING SOIL

The subject invention relates to a method and an apparatus for cultivating soil by forcing bursts of a pressurized fluid into the soil. More particularly, an apparatus is provided having a plurality of soil working members radially extending from a horizontal rotatable shaft and having conically shaped soil piercing nozzles connected at one end thereof. The rotatable shaft is mounted on a movable frame intended to be drawn by a tractor such that the translational movement of the frame causes the rotation of the shaft via the soil engagement by the nozzles. When the nozzles enter the soil, and the soil working members are in a vertically downward position, a short burst of pressurized fluid is forced therethrough to break up the soil into small pieces.

Cultivating devices found in the prior art, generally provide for blade-like members to be drawn through the soil to cut and turn over the layers of soil. The density of the soil provides great resistance to the movement of the blades as it is being pulled therethrough. Consequently, the tractor which pulls the prior art devices must expend great amounts of energy to overcome the resistance of the soil which thereby results in increased fuel usage. Further, since the prior art cultivating devices overturn and expose the lower layers of the soil to the sun, needless evaporation of the moisture in the soil occurs.

Accordingly, it is an object of the subject invention to provide a new and improved cultivating apparatus which is capable of efficient operation.

It is a further object of the subject invention to provide a cultivating apparatus that reduces fuel usage by minimizing the resistance created by the apparatus since the nozzles penetrate the soil under the force of the weight of the apparatus.

It is another object of the subject invention to provide a cultivating apparatus that breaks up the soil with short bursts of pressurized air.

It is still a further object of the subject invention to provide an apparatus that breaks up the soil by using short bursts of pressurized liquid.

It is another object of the subject invention to provide a cultivating apparatus which may simultaneously fertilize and break up the soil.

It is another object of the subject invention to provide a cultivating apparatus which minimizes the amount of water evaporated from the soil.

In accordance with these and many other objects, the subject invention provides a horizontal hollow shaft which is rotatably mounted on a wheeled frame intended to be pulled by a tractor. A plurality of longitudinal rows of hollow rods radially extend from the shaft with each rod being tipped with a conically shaped bladed nozzle for piercing the soil. A set of pipes is disposed inside the hollow shaft and communicate with a source of pressurized fluid and the hollow rods during cultivation. As the apparatus is pulled by a tractor, a longitudinal row of nozzles begins to penetrate the soil under the force of the weight of the apparatus, and when they are in a vertically downward position a control valve automatically releases a burst of pressurized fluid which is routed through the pipes to the nozzles. The pressurized fluid is vented through outlet openings in the nozzles which functions to break up the soil into small pieces. The number and arrangement of outlet opengings in the nozzles provides a controlled supply of pressurized fluid into the compact soil so that it is broken up into small pieces. As the tractor continues to pull the frame, the first set of nozzles is freed from the soil while the next longitudinal set of nozzles begins to penetrate into soil and the cycle of the apparatus is repeated.

Further objects and advantages of the present invention will become apparent from the following detailed description, taken in conjunction with the drawings in which.

Figure 3:
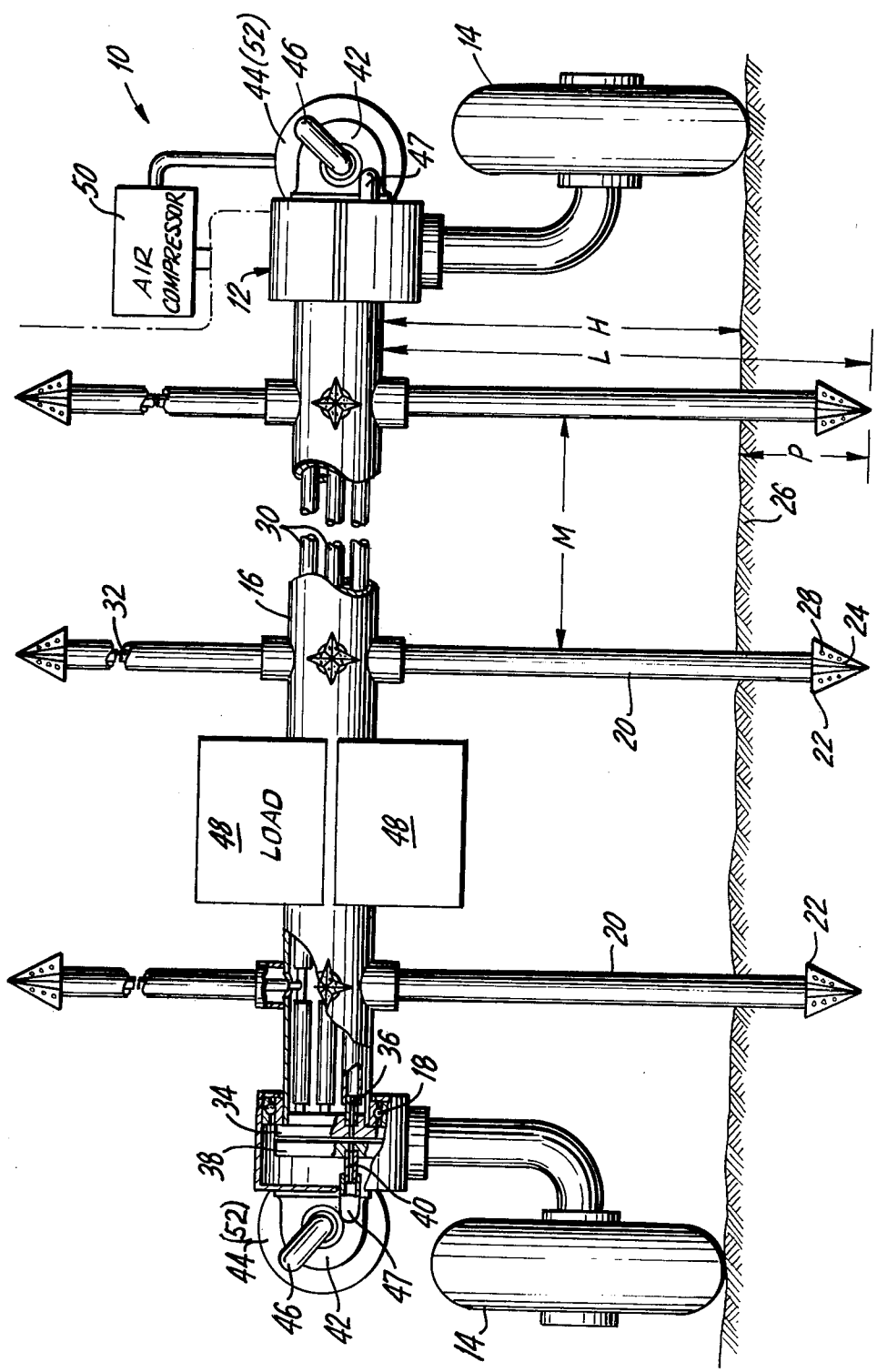
FIG. 3 is a longitudinal view, partially in section, of the apparatus of the subject invention.

Referring to FIG. 3, a longitudinal view, partially in section, of the apparatus 10 of the subject invention is illustrated. A frame 12 is provided which is mounted on wheels 14 and is intended to be pulled by a tractor or other like locomotive source. A hollow shaft 16 is rotatably mounted by bearings 18 within frame 12. A plurality of hollow rods 20 are radially mounted in longitudinal rows around shaft 16. As illustrated in FIG. 3, four longitudinal rows of rods 20 are provided and are disposed at 90° angles from each other. Each rod 20 is tipped with a conically shaped nozzle 22. Nozzles 22 include a plurality of fluted blades 24 for piercing the soil 26. A plurality of outlets 28 are provided in the nozzles 22 to allow for the venting of the pressurized fluid. The total length L of each rod 20 is greater than the distance H from the soil surface to shaft 16 resulting in a penetration of depth P. The optimum amount of penetration P, as well as the number of rods 20 and the optimum spacing M between the rods is dependent upon the physical properties of the soil to be cultivated.

Hollow shaft 16 houses a plurality of primary pipes 30 running longitudinally therethrough with the number of primary pipes 30 corresponding to the number of longitudinal rows of rods 20. Each rod 20 houses a secondary pipe 32 which is in communication with both nozzles 22 and the associated primary pipe 30. A flange 34 is connected to the end of the hollow shaft 16 and will rotate therewith. Rotating flange 34 has a plurality of openings 36 equal to the number of primary pipes 30 and in communication therewith. A stationary flange 38 is provided in the frame 12 disposed in slidable contact with rotating flange 34, and includes one opening 40. Opening 40 is positioned to be in alignment with opening 36, in the rotating flange 34, that is in communication with the particular primary pipe 30, associated with the longitudinal set of rods 20 which is then in the vertically downward position.

An automatic valve means 42 is provided to sequentially release a short burst of pressurized fluid. The valve means 42 is preferably electrical and can be powered by the tractor's electrical system. The valve means 42 is arranged so that it will automatically actuate during the short period, while cultivating, when an opening 36 of flange 34 becomes aligned with the opening 40 of stationary flange 38. Tanks 44 (52) are mounted on frame 12 for storage of air, liquid or both. A tube 46 is provided to connect the tank 44 to valve 42, while a tube 47 is provided to connect valve 42 to the opening 40 in stationary flange 38.

To facilitate the penetration of the nozzles 22 into the soil, weight loads 48 are mounted on shaft 16 between the radial sets of rods 20. The amount of weight used will depend on the physical properties of the soil.

In operation, apparatus 10 is pulled behind a tractor such that the nozzles 22 of a longitudinal row of rods 20 begin to penetrate the soil under the force of the weight of the apparatus 10. The nozzles 22 engagement with the soil causes the rotation of shaft 16 within bearings 18. When the first longitudinal row of rods 20 is in the vertically downward position, electrical control valve 42 will actuate thus permitting a burst of pressurized fluid to travel from tank 44 through the aligned openings 40 and 36 in flanges 38 and 34, and into the associated primary pipe 30. The pressurized fluid is channeled into secondary pipes 32 and vented through outlets 28 of nozzles 22. This pressurized burst of fluid functions to break apart the soil in and around the nozzle 22. As the tractor continues to pull the apparatus 10, the first set of nozzles 22 disengage from the soil while a second longitudinal row of rods 20 and the associated nozzles 22, begin to penetrate the soil and the cycle is repeated.

Figure 1:
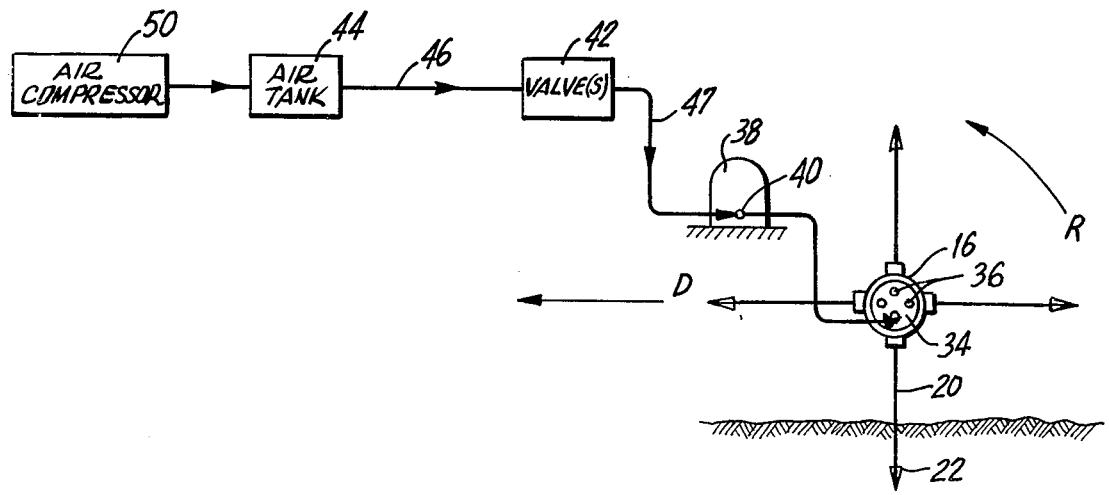
FIG. 1 is a schematic illustration of the apparatus of the subject invention.

The apparatus 10 of the subject invention can be used to inject pressurized air only, which will break up the soil, or alternatively, a pressurized liquid can be injected whereby the soil can be simultaneously fertilized and cultivated. More particularly, as seen in FIG. 1, an air compressor 50 which is preferably powered by the tractor engine, pressurizes air in air tank 44 where it is stored until released by valve 42. In this embodiment, when a longitudinal row of rods 20 is disposed in a vertically downward position, the valve 42 will release a short burst of pressurized air into the associated pipe 30 and then into secondary pipes 32 to be vented by outlets 28 thereby breaking up the soil. As illustrated in the schematic diagram of FIG. 1, the shaft 16 rotates in a direction R in response to the forward movement D of the apparatus.

Figure 2:
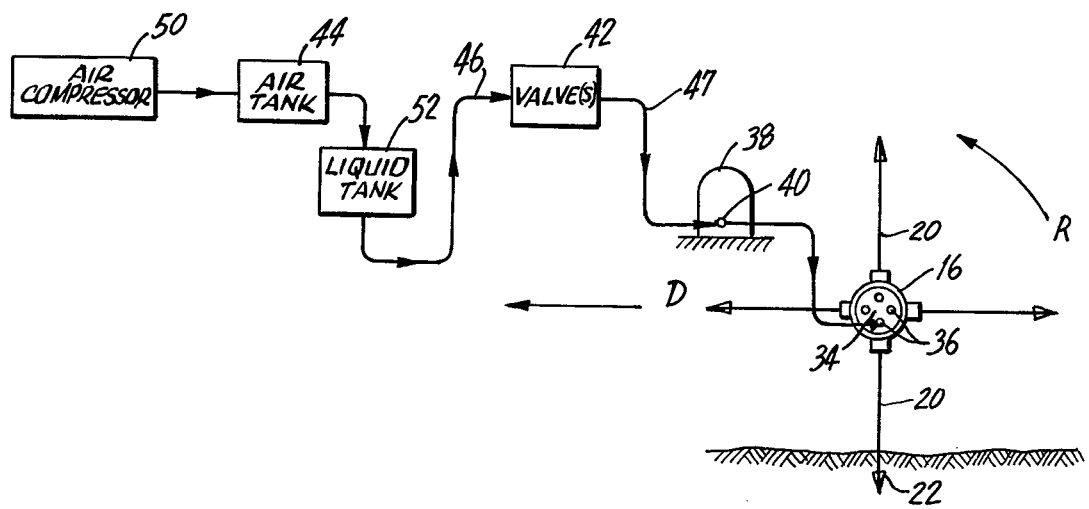
FIG. 2 is a schematic view of another embodiment of the apparatus of the subject invention.

In an alternative embodiment as illustrated in FIG. 2, the pressurized air in tank 44 is connected to and pressurizes a liquid storage tank 52 which contains either pure water or a liquid fertilizer mixture. As in the first embodiment when a longitudinal row of rods 20 is in a vertically downward position the valve means 42 is actuated and a short burst of pressurized liquid will be channeled through primary pipes 30, into secondary pipes 32, and vented through outlets 28. This arrangement permits the simultaneous fertilization and cultivation of the soil.

To minimize pressurization losses, it is desirable to have a separate tank 44 and valve means 42 on each side of frame 12 (see FIG. 3). When two tanks are employed, the primary pipes 30 are sealed at their midpoints and by this arrangement and even distribution of the pressurized fluid is achieved because the pressurized fluid travels over a shorter distance. The apparatus may be provided with more than one horizontal hollow shaft (including the associated rods and nozzles) mounted on the frame to increase the efficiency of the apparatus.

Accordingly, there is provided an apparatus for cultivating soil which consists of a hollow shaft rotatably mounted on a frame member and having radially mounted longitudinal rows of hollow rods. The hollow rods are tipped with conically shaped bladed nozzles for engaging the soil. A flow of pressurized fluid is provided to the nozzles via a tank and valve arrangement which releases the pressurized fluid through a pipe system and channels the fluid to the nozzles and into the soil. The pressurized fluid can be air, water or a liquid fertilizer mixture. The burst of pressurized liquid functions to break apart the soil into small pieces.

Although the subject apparatus has been described by reference to a preferred embodiment, it is apparent that other modifications can be devised by those skilled in the art that would fall within the scope and spirit of the present invention as defined by the appended claims.

What is claimed is:

1. An apparatus for cultivating soil by forcing a pressurized fluid therethrough comprising:

a wheeled frame;

a source of pressurized fluid mounted on said frame;

means for controlling the flow from said source of pressurized fluid;

a hollow shaft horizontally and rotatably mounted on said frame;

a plurality of spaced arrays of hollow rods radially extending from said shaft, the individual rods in said arrays being radially aligned to define longitudinal rows of rods, each said rod including a generally conically shaped nozzle connected to the free end thereof, each said nozzle including a plurality of blades radially disposed around the entire periphery of said nozzle to facilitate the embedding of said nozzle in the soil, each said nozzle further including a plurality of outlets disposed along the length of said blades to facilitate the breaking up of the soil, and with the length of each said rod being greater than the distance from said soil to said rotatable shaft; and conduit means connected to said source of pressurized fluid and said outlets in said nozzles for sequentially channeling said pressurized fluid from said source to said outlets, said conduit means including a plurality of primary pipes disposed inside said hollow rotatable shaft with the number of said primary pipes corresponding to the number of longitudinal rows of said hollow rods and associated therewith, said conduit means further including a plurality of secondary pipes, with each said hollow rod having one secondary pipe disposed therein, said primary pipes being in communication with said pressurized fluid source, and with said secondary pipes being in communication with the associated primary pipe and associated nozzle, said conduit means further including a flange connected to said shaft and rotatable therewith, said rotating flange having a plurality of openings corresponding to the number of primary pipes and in communication therewith, said conduit means further including a stationary flange mounted within said frame and in slidable contact with said rotating flange, said stationary flange having an aperture in communication with said source of pressurized fluid and disposed such that it is sequentially aligned with the opening in said rotating flange which communicates with the primary pipe that is associated with the particular longitudinal row of rods that is then in the vertically downward position, and wherein the movement of said frame causes the sequential embedding of said nozzles of said longitudinal rows of rods in said soil whereby when a longitudinal row of rods is in the vertically downward position, said means for controlling the flow of said source of pressurized fluid releases a short burst of pressurized fluid such that said fluid is channeled through the aligned apertures in said flanges, and through the associated primary pipe to the associated secondary pipes and to said embedded nozzles and is vented through said outlets thereby breaking up the soil.

2. An apparatus for cultivating soil as recited in claim 1 wherein said longitudinal rows of rods are spaced apart at equal angles around the circumference of said shaft.

3. An apparatus for cultivating soil as recited in claim 1 wherein said fluid is air.

4. An apparatus for cultivating soil as recited in claim 1 wherein said fluid is a liquid.

5. An apparatus for cultivating soil as recited in claim 4 wherein said liquid is a fertilizer such that said soil is simultaneously cultivated and fertilized.

* * * * *